(12) United States Patent
Fidi

(10) Patent No.: US 10,050,805 B2
(45) Date of Patent: Aug. 14, 2018

(54) METHOD FOR TRANSMITTING MESSAGES IN A COMPUTER NETWORK AND COMPUTER NETWORK

(71) Applicant: FTS COMPUTERTECHNIK GMBH, Vienna (AT)

(72) Inventor: Christian Fidi, Dietmanns (AT)

(73) Assignee: FTS COMPUTERTECHNIK GMBH, Vienna (AT)

( * ) Notice: Subject to any disclaimer, the term of this patent is extended or adjusted under 35 U.S.C. 154(b) by 153 days.

(21) Appl. No.: 14/914,826

(22) PCT Filed: Sep. 1, 2014

(86) PCT No.: PCT/AT2014/050192
§ 371 (c)(1),
(2) Date: Feb. 26, 2016

(87) PCT Pub. No.: WO2015/031926
PCT Pub. Date: Mar. 12, 2015

(65) Prior Publication Data
US 2016/0211987 A1    Jul. 21, 2016

(30) Foreign Application Priority Data
Sep. 4, 2013 (AT) .............................. A 50548/2013

(51) Int. Cl.
*H04J 3/06* (2006.01)
*H04L 12/44* (2006.01)
(Continued)

(52) U.S. Cl.
CPC ............ *H04L 12/44* (2013.01); *H04J 3/0658* (2013.01); *H04L 12/40* (2013.01);
(Continued)

(58) Field of Classification Search
CPC .................... H04L 12/44; H04L 12/40; H04L 2012/40273; H04J 3/0658
(Continued)

(56) References Cited

U.S. PATENT DOCUMENTS 7,756,027 B1 *   7/2010   Reddy ................. H04L 41/0806
                                                   370/230
2005/0094640 A1 *   5/2005   Howe ................. H04L 47/2416
                                                   370/395.1
(Continued)

*Primary Examiner* — Faisal Choudhury
(74) *Attorney, Agent, or Firm* — Eversheds Sutherland (US) LLP

(57) ABSTRACT

The invention concerns a method for transmitting messages in a computer network, wherein the computer network comprises a first set of computing nodes (101-105), which computing nodes (101-105) are connected to each other by means of at least one star coupler (201, 202) and/or at least one multi-hop network (1000), wherein each of the computing nodes of the first set of computing nodes (101-105) is connected by means of at least one communication line (110) to the at least one star coupler (201, 201) or the at least one multi-hop network (1000), and wherein the computing nodes (101-105) exchange Ethernet messages with each other and the exchange of at least some of the Ethernet messages of the computing nodes (101-105) occurs in time controlled manner. It is provided that a) the computer network comprises a second set of computing nodes (106-108), which are connected to each other by a bus (210), and wherein the bus (210) is connected to the at least one star coupler (201) and/or the at least one multi-hop network (1000), and wherein b) the second set of computing nodes (106-108) exchange Ethernet messages with each other and the exchange of at least some of the Ethernet messages of the computing nodes (106-108) occurs in time controlled manner, and wherein preferably c) the second set of computing nodes (106-108) exchange Ethernet messages with the first set of computing nodes (101-105) and the exchange of at
(Continued)

Figure 1:
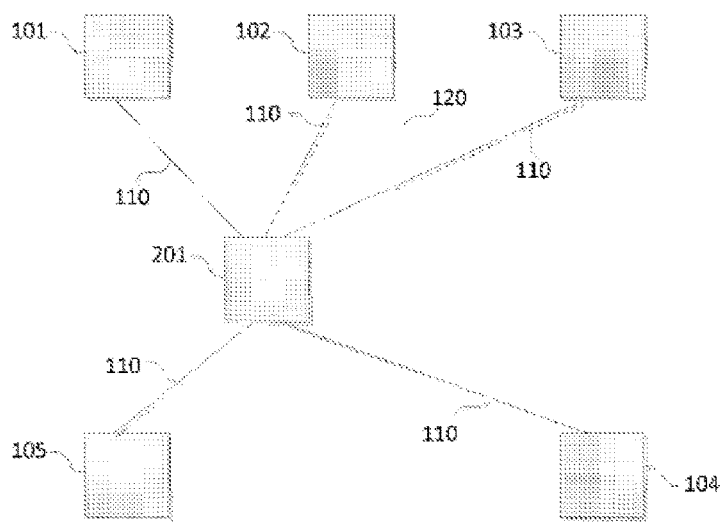

least some of the Ethernet messages of the computing nodes (101-108) occurs in time controlled manner.

30 Claims, 8 Drawing Sheets

(51) Int. Cl.
    *H04L 12/403*     (2006.01)
    *H04L 12/417*     (2006.01)
    *H04L 12/40*     (2006.01)

(52) U.S. Cl.
    CPC ........ *H04L 12/4035* (2013.01); *H04L 12/417* (2013.01); *H04L 2012/40273* (2013.01)

(58) Field of Classification Search
    USPC .......................................... 370/503
    See application file for complete search history.

(56) References Cited

U.S. PATENT DOCUMENTS

| | | | | |
|---|---|---|---|---|
| 2006/0212604 | A1* | 9/2006 | Beckhoff | H04L 12/4637 |
| | | | | 709/251 |
| 2010/0281130 | A1* | 11/2010 | Kopetz | H04L 12/40026 |
| | | | | 709/207 |
| 2013/0058217 | A1* | 3/2013 | Smithgall | H04L 43/50 |
| | | | | 370/241 |
| 2013/0215905 | A1* | 8/2013 | Driscoll | H04L 12/40136 |
| | | | | 370/445 |

\* cited by examiner

METHOD FOR TRANSMITTING MESSAGES IN A COMPUTER NETWORK AND COMPUTER NETWORK

The invention concerns a method for transmitting messages in a computer network, wherein the computer network comprises a first set of computing nodes, which computing nodes are connected to each other by means of at least one star coupler and/or at least one multi-hop network, wherein each of the computing nodes of the first set of computing nodes is connected by means of at least one communication line to the at least one star coupler or the at least one multi-hop network, and wherein the computing nodes exchange Ethernet messages with each other and the exchange of at least some of the Ethernet messages of the computing nodes occurs in time controlled manner.

Moreover, the invention concerns a computer network, such as a TTEthernet computer network, wherein the computer network comprises a first set of computing nodes, which computing nodes are connected to each other by means of at least one star coupler and/or at least one multi-hop network, wherein each of the computing nodes of the first set of computing nodes is connected by means of at least one communication line to the at least one star coupler or the at least one multi-hop network, and wherein the computing nodes exchange Ethernet messages with each other and the exchange of at least some of the Ethernet messages of the computing nodes occurs in time controlled manner.

The present invention lies in the field of computer technology. It specifies an innovative method and supporting hardware for using an Ethernet network, which implements a communication method in time controlled manner and which in the prior art requires a star, tree or ring topology of the network, also in a topology which is partly configured as a bus. One example of such an Ethernet network is TTEthernet per the standard SAE AS6802.

The invention lies in the area of distributed real-time systems, such a real-time system consisting of two kinds of active components: computing nodes and star couplers. Computing nodes execute functions such as the measuring of properties of physical processes by means of suitable sensors, the calculation of setpoint values, or the activating of actuators, such as valves. Computing nodes are connected to other computing nodes and/or star couplers by means of bidirectional lines. Furthermore, star couplers can also be connected to each other by bidirectional lines. The information exchange between components works in message-oriented manner and in the following specification we shall assume that the information exchange uses Ethernet messages. Messages can have different identities, and all messages with the same identity form a "message stream".

Moreover, some of the components or possibly all the components of the distributed real-time system have access to a global time base. That is, the components of the distributed real-time system have local clocks which are synchronized with each other. The maximum difference between two non-faulty clocks in the distributed real-time system can be calculated. We shall designate this maximum difference as the precision of the clocks in the distributed real-time system. Typical values for the precision are in the region of single-digit microseconds, but can easily be higher or lower than this.

In such a real-time system the so-called communication paradigm can be implemented in time controlled manner, in which the computing nodes send messages by an established time plan (a so-called schedule). Messages which are sent in this way are called messages in time controlled manner. The schedule is typically organized so that the time-controlled messages are transported through the network with the shortest possible and most constant duration possible.

One example of an Ethernet-based real-time system which implements communication paradigms in time controlled manner is the TTEthernet protocol. The TTEthernet protocol according to standard SAE AS6802 uses the terms "End System" as a synonym for computing nodes and "switch" as a synonym for star coupler. Moreover, all messages in TTEthernet which are communicated between computing nodes and star couplers are Ethernet messages. A TTEthernet network according to standard SAE AS6802 always consists of computing nodes and star couplers. Computing nodes are always connected directly to one or more star couplers, so that the message exchange of two or more computing nodes always functions directly by means of one or more star couplers.

One problem of the invention is to realize a cost-favorable realization of such networks, especially of TTEthernet networks.

This problem is solved with a method as mentioned at the outset and a computer network as mentioned at the outset, in that according to the invention a) the computer network comprises a second set of computing nodes, which are connected to each other by a bus, and wherein the bus is connected to the at least one star coupler and/or the at least one multi-hop network, and wherein b) the second set of computing nodes exchange Ethernet messages with each other and the exchange of at least some of the Ethernet messages of the computing nodes occurs in time controlled manner, and wherein preferably c) the second set of computing nodes exchange Ethernet messages with the first set of computing nodes and the exchange of at least some of the Ethernet messages of the computing nodes occurs in time controlled manner.

The present invention expands TTEthernet in an innovative manner, in which computing nodes can communicate directly with each other by means of a bus. Moreover, the bus which connects the TTEthernet computing nodes to each other can also be connected to a star coupler. For this, the present invention solves a fundamental problem, namely, how the computing nodes in a bus topology can be synchronized with each other and in dependence on an existing TTEthernet system, especially a TTEthernet system according to standard SAE AS6802.

The expansion with the possibility of a bus topology enables cost-favorable realizations of TTEthernet networks, since star couplers can be spared.

In what follows, advantageous embodiments of the method and the computer network according to the invention are explained, which can be realized alone or in any given combinations with each other.

It can be advantageous when the computer network has precisely one star coupler or precisely one multi-hop network to which the computing nodes are connected.

For the purpose of fault tolerance, it is advantageous when each of the computing nodes of the first set of computing nodes is connected to two or more star couplers and/or to two or more multi-hop networks by means of communication lines and the computing nodes of the first set of computing nodes send redundant copies of the Ethernet messages in parallel by these redundant communication lines.

It can also be provided that the computing nodes of the second set of computing nodes are connected to each other by means of two or more redundant buses, such that each of the computing nodes of the second set of computing nodes is connected by to least two buses, preferably to all buses.

It can be expedient if each redundant bus is connected to a star coupler specially assigned to it or a multi-hop network specially assigned to it.

Each star coupler or each multi-hop network in this case is connected to precisely only one bus.

Moreover, it can be provided that at least some of the computing nodes of the first set of computing nodes and the at least one star coupler or at least one star coupler of a multi-hop network construct a synchronous time base. This time base can be used in the communication paradigm in time controlled manner.

Furthermore, it can be provided that the star coupler(s) and/or the multi-hop network(s) send Ethernet messages to the computing nodes of the second set of computing nodes, which messages are used for synchronization of the local clocks of the computing nodes of the second set of computing nodes.

These messages can then be used furthermore for the communication paradigm in time controlled manner.

Moreover, it can be provided that the computing nodes of the second set of computing nodes save local information on the transmission durations occurring on the at least one bus during the transmission of the Ethernet messages to the computing nodes of the second set of computing nodes from the at least one star coupler and/or the at least one multi-hop network.

This information on the transmission durations can be used to improve the synchronization of the local clocks of the computing nodes of the second set of computing nodes.

It can furthermore be provided that the at least one star coupler and/or the at least one multi-hop network sends different Ethernet messages to the computing nodes of the second set of computing nodes across the at least one bus and these messages contain information on the transmission durations occurring on the at least one bus during the transmission from a star coupler to the respective computing node.

This information regarding the transmission durations can be used to improve the synchronization of the local clocks of the computing nodes of the second set of computing nodes.

In one variant of the invention it is provided that the SAE AS6802 standard or a standard based on this or a successor standard is used to implement the communication paradigm in time controlled manner.

It can be provided that, for each bus, at most one of the computing nodes of the second set of computing nodes is configured as a synchronization master according to the SAE AS6802 standard and all the other computing nodes of the second set of computing nodes are configured as synchronization clients.

It can be advisable if the star coupler(s) to which the bus or buses are directly connected are configured as compression master according to the SAE AS 6802 standard.

It can be provided that those Ethernet messages which are used for the synchronization of the computing nodes of the second set of computing nodes are protocol control frames according to the SAE AS 6802 standard.

In one variant of the invention it is provided that the IEEE 802.1AS standard or a standard based on this or a successor standard is used to implement the communication paradigm in time controlled manner.

It can also be provided that the IEEE 1588 standard or a standard based on this or a successor standard is used to implement the communication paradigm in time controlled manner.

Moreover, it can also be provided that the IEEE 802.1Q standard or a standard based on this or a successor standard is used to implement the communication paradigm in time controlled manner en.

In one favorable embodiment, it can furthermore be provided that the at least one star coupler and/or the at least one multi-hop network sends messages not in time controlled manner as messages in time controlled manner to computing nodes which are connected by means of a bus.

It is also advisable for the at least one star coupler and/or the at least one multi-hop network to send messages in time controlled manner, which are received by the at least one star coupler and/or the at least one multi-hop network from computing nodes which are connected by means of a bus, as messages in non-time controlled manner to computing nodes.

Finally, it is also advantageous for the bus or buses to have one, two, or more of the following technical properties:

a) as the physical bus, technology EIA-485 with a data rate of 10 Mbps is used;

b) the data transmission is based on the Manchester Code per IEEE 802.5;

c) for the communication of the bus participants, a physical medium is used which is based on shielded and twisted two-wire conductors;

d) the physical coupling of the individual participants to the bus medium is done by means of
stub-connected terminals or
daisy-chained terminals;

e) as the physical bus, technology MIL-STD-1553B with a data rate of 10 Mbps is used.

Figure 1A:
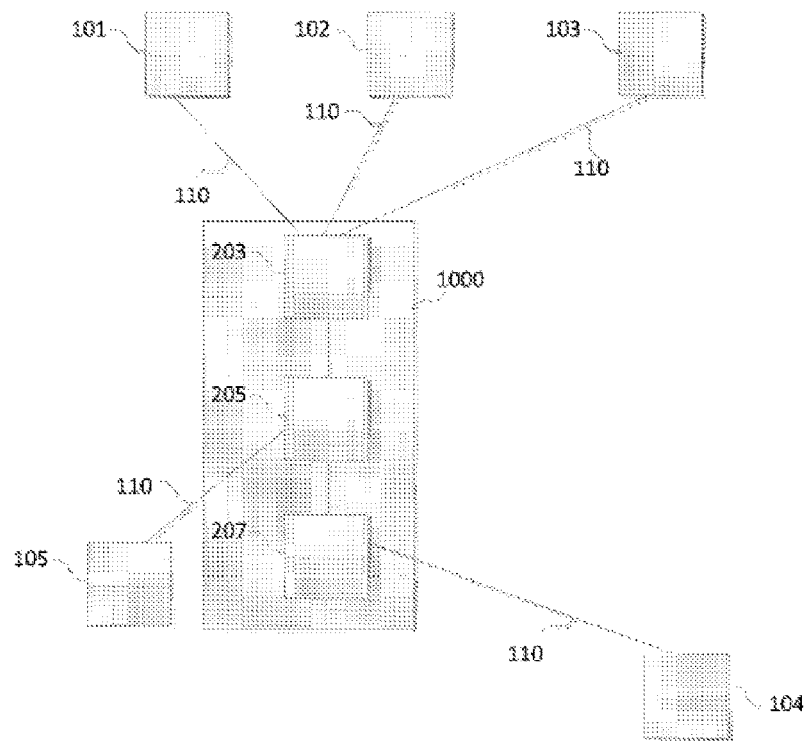
Figure 1B:
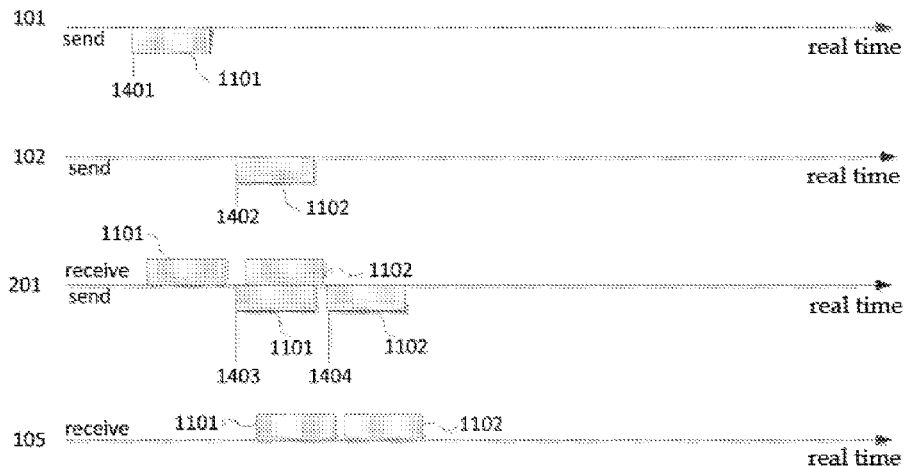
Figure 1C:
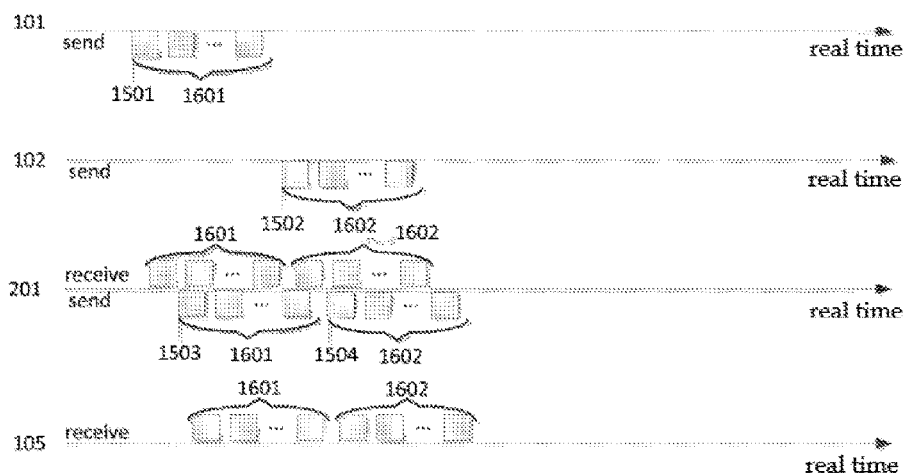
Figure 2:
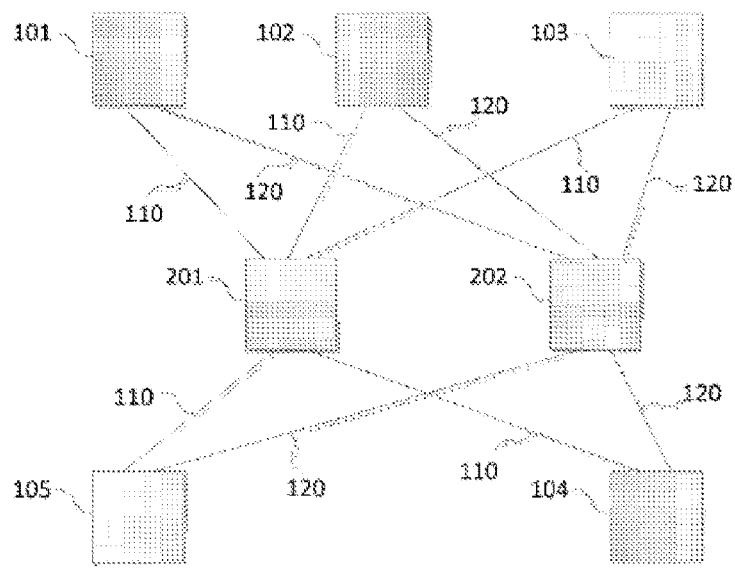
Figure 3:
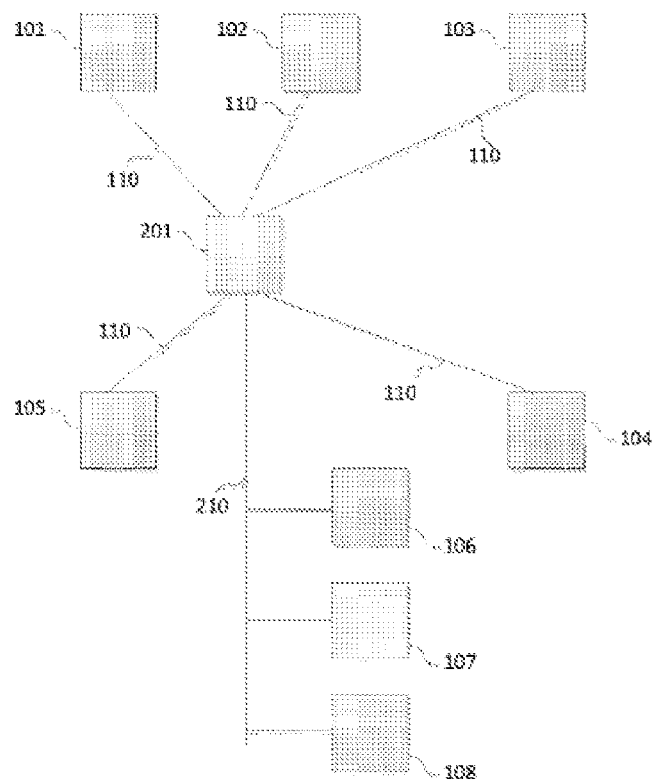
Figure 4:
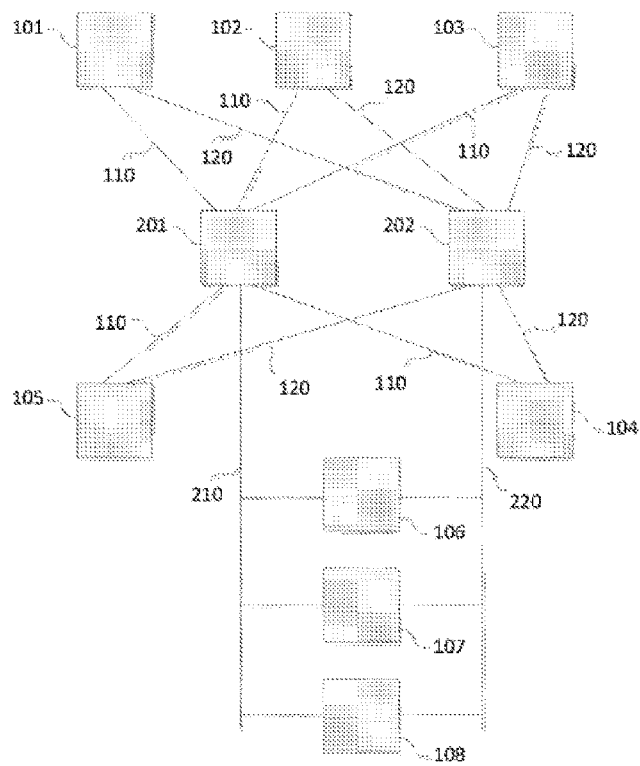
Figure 5:
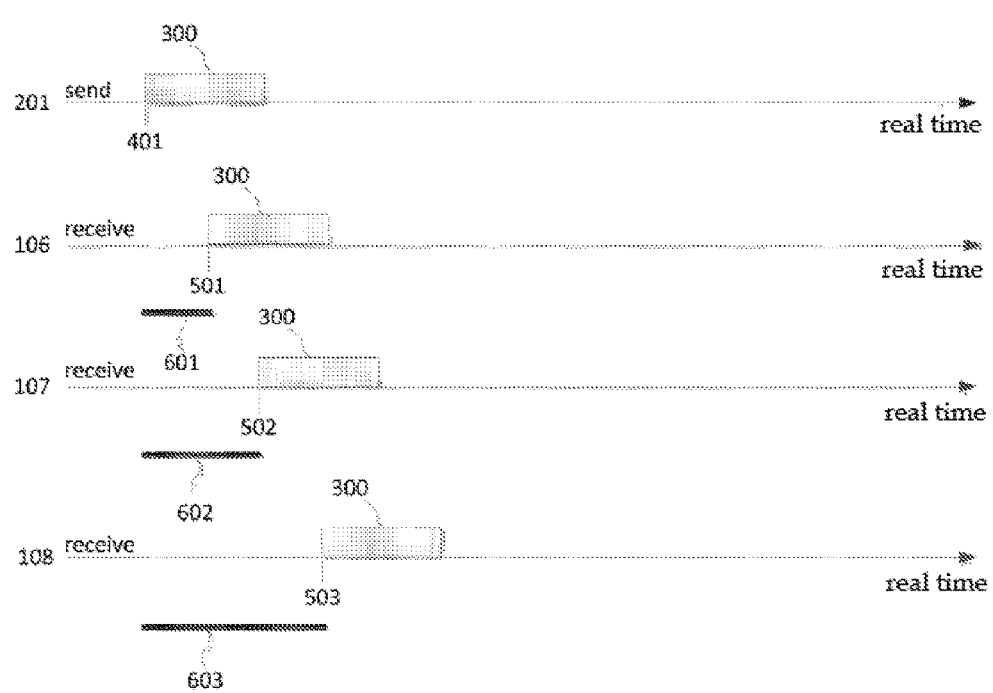
Figure 6:
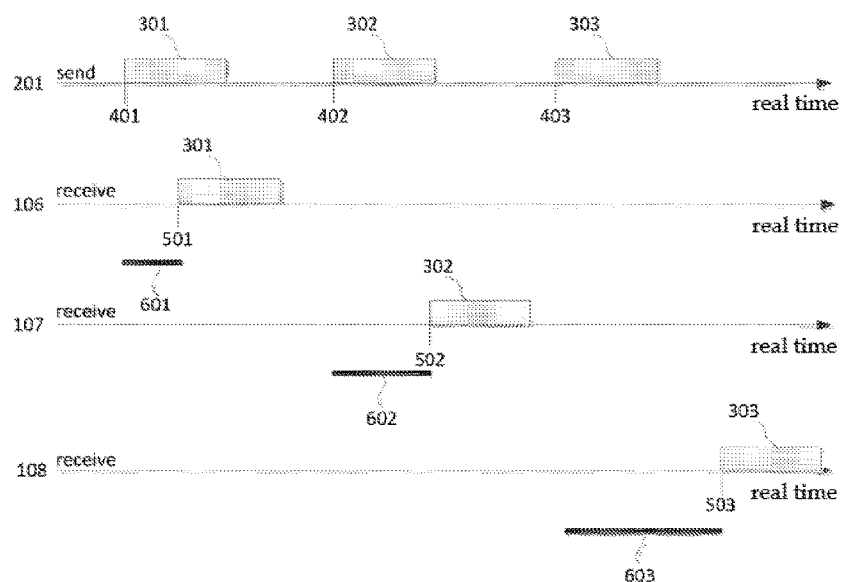
Figure 7:
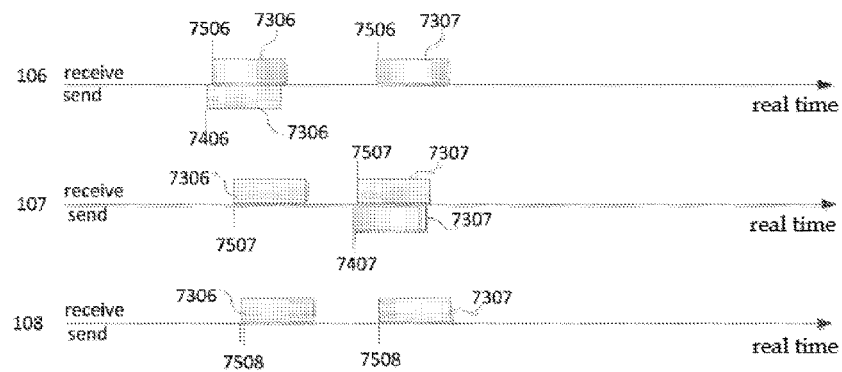
Figure 8:
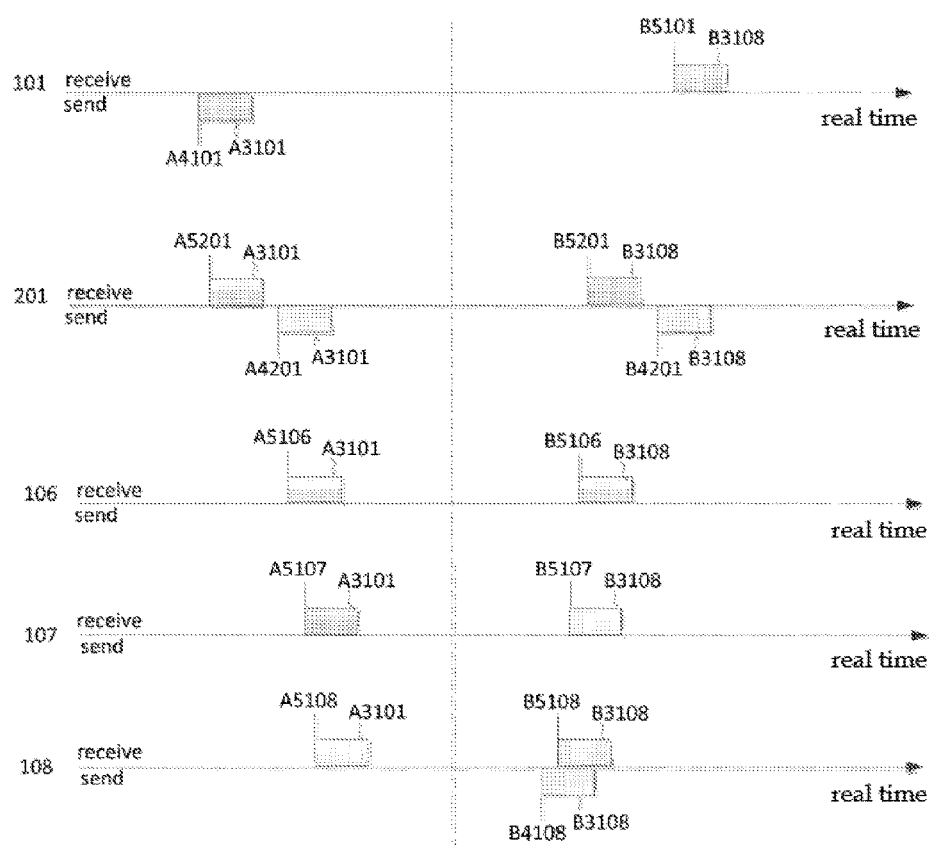
Figure 9:
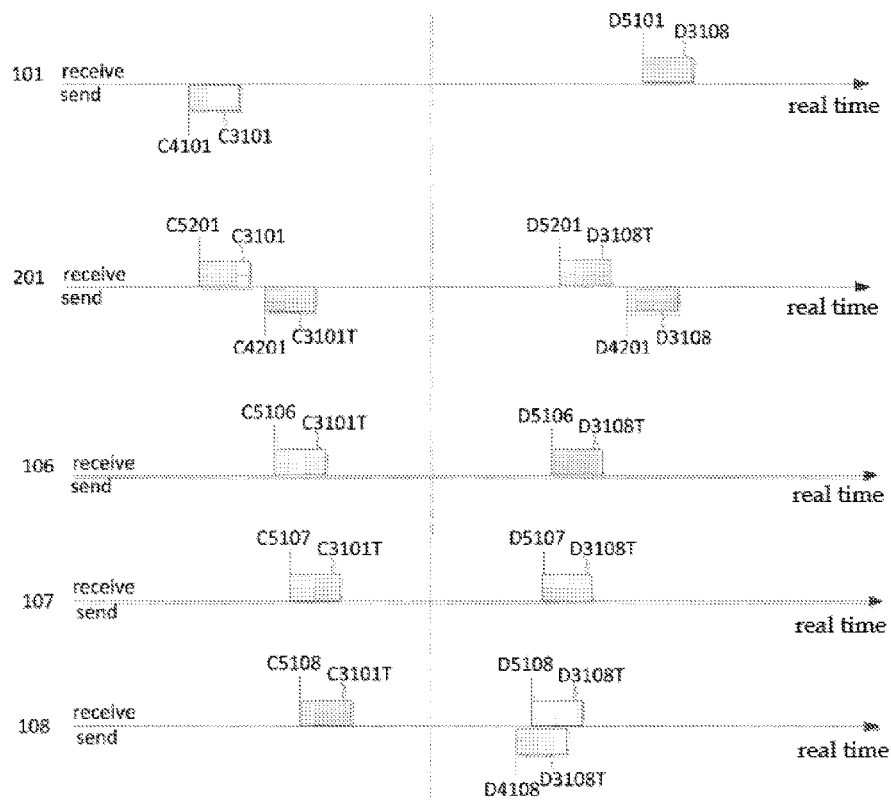
Figure 10:
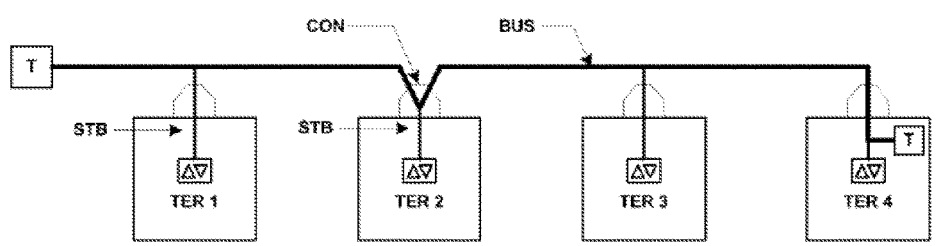
Figure 11:
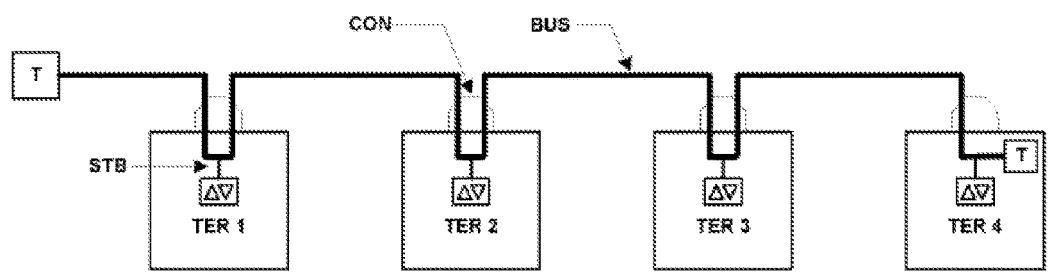
Figure 12:
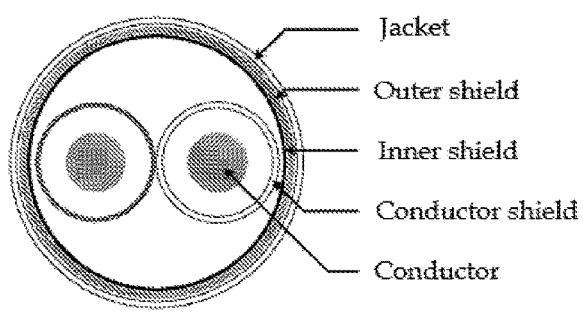

In what follows, the invention is explained more closely with the aid of the drawing by means of a sample embodiment. There is shown:

FIG. 1 an example of an Ethernet network, which implements communication in time controlled manner, in which computing nodes 101-105 are connected by means of bidirectional communication lines 110 to a star coupler 201, FIG. 1a another example of an Ethernet network, FIG. 1b a flow chart illustrating communication in time controlled manner, FIG. 1c another sample flow chart, FIG. 2 an example of an Ethernet network, which implements communication in time controlled manner, in which computing nodes 101-105 are connected by means of redundant bidirectional communication lines 110, 120 to redundant star couplers 201, 202, FIG. 3 an example of an Ethernet network, which implements communication in time controlled manner and in addition to the network in FIG. 1 also implements a network portion as a bus 210 by which computing nodes 106-108 can communicate directly with one another, FIG. 4 an example of an Ethernet network, which implements communication in time controlled manner and in addition to the network in FIG. 2 also implements a network portion as a redundant bus 210, 220 by which computing nodes 106-108 can communicate directly with one another, FIG. 5 a flow chart of a communication scenario as to how the computing nodes in the bus 106-108 can be synchronized by synchronization messages of the star coupler 201, FIG. 6 a flow chart of a communication scenario as to how the computing nodes in the bus 106-108 can be synchronized by synchronization messages of the star coupler 201, FIG. 7 a flow chart of a communication scenario as to how the computing nodes in the bus 106-108 can communicate in time controlled manner, FIG. 8 a flow chart of a communication scenario as to how the computing nodes in the bus 106-108 can communicate and with computing nodes 101-105 which are directly connected to a star coupler 201, 202, in time controlled manner, FIG. 9 a flow chart of another communication scenario, FIG. 10 a coupling of the bus participants by means of stub connections, FIG. 11 a coupling of the bus participants by means of daisy-chain connections, and FIG. 12 a cable layout of a bus cable.

The following specific example deals with one of the many possible realizations of the method according to the invention and the computer network according to the invention.

FIG. 1 shows an example of an Ethernet network which implements communication in time controlled manner, such as a TTEthernet network according to the standard SAE AS6802. Computing nodes 101-105 of the network are connected by means of bidirectional communication lines 110 to a star coupler 201. The local time of the computing nodes and the star coupler can be synchronized, for example, with the TTEthernet protocol. For this, one or more computing nodes are configured as synchronization master and the switch is configured as compression master. Computing nodes which are not configured as synchronization master can be configured as synchronization client. The computing nodes exchange messages with each other in time controlled manner by sending the messages by a schedule to the star coupler 201, which then relays them onward.

FIG. 1a shows that several star couplers can also be connected to each other and computing nodes 101-105 are connected only to a subset of these star couplers 203, 205, 207. The communication between two computing nodes can then also occur through two or more star couplers 203,205, 207. Such network structures are known as multi-hop networks 1000. The following specification does not deal explicitly with multi-hop networks, but it is known in the prior art that individual star couplers can be replaced by a multi-hop network 1000. The SAE AS6802 standard also describes how the computing nodes 101-105 and star couplers 203,205,207 are configured in these networks.

FIG. 1b shows an example of a flow chart illustrating communication in time controlled manner. In the example, the computing nodes 101, 102 as shown in FIG. 1 transmit messages 1101, 1102 in time controlled manner through the star coupler 201 to the computing nodes 105. The special nature of a communication in time controlled manner is that the sending times 1401, 1402 and/or the relaying times 1403, 1404 of the messages in time controlled manner are already known prior to the sending of the message. The sending times 1401, 1402 and/or the relaying times 1403, 1404 for example can be determined already during the design of the distributed real-time system. The determination of the sending times, relaying times, reception times or a subset of these is known as the communication schedule.

FIG. 1c shows another example of a flow chart illustrating communication in time controlled manner. In contrast to FIG. 1b, in FIG. 1c each time groups 1601, 1602 of time-controlled messages are coordinated with a sending time 1501, 1502 and a relaying time 1503, 1504. As shown in FIG. 1d, the allocation of message to group 1601, 1602 remains unchanged. But this is not necessarily the case: thus, the star coupler 201 could implement only the relaying time 1503 and, once the relaying time 1503 is reached, relay all messages of the groups 1601, 1602. In general, the allocation of message to a group can be reorganized in any given way per each computing node and star coupler.

FIG. 2 shows an example of an Ethernet network which implements communication in time controlled manner, such as a TTEthernet network according to the standard SAE AS6802, in which computing nodes 101-105 are connected by means of redundant bidirectional communication lines 110, 120 to redundant star couplers 201, 202. Computing nodes can now communicate with each other, even at the same time, by both star couplers 201, 202. That is, the redundancy in this network is tolerant of the failure of individual components. If, for example, computing node 101 would like to communicate with computing node 102, it can send messages both to the star coupler 201 and to the star coupler 202. If no fault is present, both star couplers 201 and 202 will then relay the messages to the computing nodes 102. However, if one of the two star couplers 201 or 202 is faulty, it is in any case guaranteed that the particular nonfaulty star coupler 201 or 202 will reliably relay the messages of the computing node 101 to the computing node 202.

For a fault-tolerant design of the synchronization of the computing nodes and star couplers, the TTEthernet protocol can be used. In this case, more than one computing node is configured as the synchronization master and both star couplers are configured as compression master. Computing nodes which are not configured as synchronization master are configured as synchronization clients. In this way, both the failure of individual computing nodes and/or the failure of individual star couplers are tolerated and the synchronization of the fault-free computing nodes and star couplers can continue to be maintained.

FIG. 3 shows an example of an Ethernet network which implements communication in time controlled manner, such as a TTEthernet network according to the standard SAE AS6802. In addition to the network in FIG. 1, there is also implemented a network portion as a bus 210, by which computing nodes 106-108 can communicate directly with one another. If TTEthernet is used for the synchronization, at most one of the computing nodes 106-108 communication with each other through the bus will be configured as a synchronization master, all other of these computing nodes 106-108 are configured as synchronization clients. The star coupler 201 is configured as compression master. The computing nodes 106-108 in the bus 210 receive synchronization messages from the star coupler(s) 201 to which they are synchronized.

FIG. 4 shows an example of an Ethernet network which implements communication in time controlled manner, such as a TTEthernet network according to the standard SAE AS6802, and in addition to the network in FIG. 2 it also implements a network portion as a redundant bus 210, 220, by which the computing nodes 106-108 can communicate directly with each other. Here as well as in the nonredundant case (FIG. 3) if TTEthernet is used for the synchronization at most one of the computing nodes 106-108 is configured as synchronization master and the remaining computing nodes 106-108 are configured as synchronization client. In order to achieve fault tolerance for the synchronization, both star couplers 201 and 202 are configured as compression masters. That is, the computing nodes receive redundant synchronization information from star coupler 201 and 202 by the respective buses 210 and 220. The failure of one bus and/or one star coupler can therefore be tolerated and the synchronization of the computing nodes 101-108 will still exist.

FIG. 5 shows a flow chart of a communication scenario which shows how the computing nodes in the bus 106-108 are synchronized by synchronization messages 300 of the star coupler 201. The star coupler 201 periodically (perhaps with slight measurement errors) sends synchronization messages 300 by the bus 210 to the computing nodes 106-108. The sending time 401 of the message 300 differs from the reception times 501-503 of the message 300 in the computing nodes 106-108. These differences 601-603 between sending time 401 and reception time correspond to the transmission durations of the message 300 and result from technological characteristics of the bus, such as the distance between star coupler 201 and computing nodes 106-108. As shown, the transmission durations 601-603 from computing node to computing node will therefore be different.

The different transmission durations, insofar as they are not compensated, have direct influence on the quality of the synchronization of the clocks in the computing nodes 106-108. The computing nodes can compensate for the different transmission durations by measuring the transmission durations 601-603 and factoring them into the synchronization process. If TTEthernet is used as the synchronization protocol, the "Transparent Clock" mechanism and/or the "Permanence Function" can be used for this.

FIG. 6 shows another flow chart of a communication scenario which shows an alternative as to how the computing nodes in the bus 106-108 can be synchronized by synchronization messages 300 of the star coupler 201. In this flow chart, the star coupler 201 sends individual synchronization messages 301-303 for each of the computing nodes 106. The different transmission durations 601-603 can also be compensated here by the star coupler 201, which writes information as to the different transmission durations 601-603 in the synchronization messages 301-303. If TTEthernet is used as the synchronization protocol, the "Transparent Clock" mechanism and/or the "Permanence Function" can be used for this.

FIG. 7 shows an example of a time-controlled manner communication schedule for the computing nodes 106-108, which are communicating by a bus 210, 220. In this example, computing node 106 sends in time controlled manner a message 7306 to a bus 210, 220 at time 7406. Computing nodes 107 and 108 start the reception of the message 7306 at times 7507 and 7508. Furthermore, computing node 106 also receives its own message as of time 7506. As soon as computing node 106 has finished sending the message 7306 and furthermore the reception of the message 106 in computing nodes 107 and 108 is also finished, one of the computing nodes 106-108 in the bus 210, 220 can send the next message. In this example, it is the computing node 107, which at time 7407 sends the next message 7307, which is received by computing nodes 106 and 108 and furthermore by computing node 107 itself at times 75062, 75072 and 75082. What is common to the communication schedules in the bus 210, 220 is that the times 7406, 7407 of sending of time-controlled messages 7306, 7307 must always be scheduled sufficiently wide apart from each other in order to avoid collisions on the bus of the messages sent in time controlled manner.

FIG. 8 shows a flow chart of communication scenarios. As an example, it shows how one can communicate in time controlled manner in a network, such as that shown in FIGS. 1 to 4, between computing nodes 101-105 which are connected to a star coupler 201, 202 or a multi-hop network 1000 and computing nodes 106-108 which are connected by a bus 201, 202 to a star coupler 201, 202 of the network.

The flow chart describes, at the left side, a scenario in which the computing node 101 relays messages A3101 via the star coupler 201 in time controlled manner on a bus 210, 220 to the computing nodes 106-108: computing node 101 sends its message A3101 at time A4101 to the star coupler 201, which begins to receive the message A3101 at time A5201 and relays it at time A4201. The computing nodes 106-107, which are connected to each other via a bus 210, 220, receive the message A3101 from the star coupler 201 at times A5106, A5107 and A5108.

The flow chart describes on the right side a scenario in which the computing node 108, which is connected by a bus 210,220 to the network, sends in time controlled manner the message B3108 to the network: computing node 108 sends its message B3108 at time B4108. The computing nodes in the bus 210, 220 receive the message B3108 at times B5106, B5107 and B5108. The star coupler 201 receives the message B3108 at time B5201 and relays it at time B4201 to the computing node 101. Computing node 101 receives the message at time B5101.

FIG. 9 shows a flow chart of a communication scenario. It describes the possibility of computing nodes 101-105 which are connected directly to star couplers 201, 202 also being able to send messages at any given times (i.e., not in time controlled manner). In this case, a star coupler 201 can save these non-time controlled messages and send them itself at predetermined times to the computing nodes 106-108 in the bus 210, 220. That is, a star coupler can likewise send non-time controlled messages in time controlled manner and thereby make the non-time controlled messages into time-controlled messages.

On the left side, FIG. 9 shows how computing node 101 sends a non-time controlled message C3101 via the star coupler 201 to the computing nodes 106-108, which are connected to each other by means of a bus 210, 220. The scenario differs only in the semantics from the scenario shown in FIG. 8, left side: whereas in FIG. 8 the sending time A4101 and at least the relaying time of message A3101 is already known prior to the communication of message A3101, this is not the case in FIG. 9, left side. Here, the message C4101 can have any given sending time. Therefore, the reception time C5201 in the star coupler 201 can also vary. But the star coupler 201 can send such non-time controlled messages C3101 as time-controlled message C3101T to a bus 210, 220.

On the right side, FIG. 9 shows how one can send messages D3108T in time controlled manner from a bus 210, 220 to the star coupler 201. But now the star coupler 201 can relay the time-controlled message D3108T as a non-time controlled message D3108T, for example, to the computing node 101, as shown. Here, once again, by contrast with FIG. 8, right side: whereas in FIG. 8 the time D4201 of the relaying of the message B3108 is given already prior to the relaying, this is not the case in FIG. 9, right side. The star coupler 201 can relay the time-controlled message D3108T as a non-time controlled message D3108.

The physical bus coupling is assured by so-called stub connections STB, as shown in FIG. 10. By "stub" is meant here the connection of a bus participant TER1-TER4 to the bus line BUS. It is possible to carry out the connection directly in a connector (for the bus participant TER2) or in a cable trunk (for the bus participants TER1, TER3, TER4), as is shown in FIG. 10.

The CON connectors are, for example, MIL-DTL-38999 connectors, such as those with type 22D, 20, twinax or quadrax contacts.

Another possibility of connection by so-called "Daisy Chain" twisting is shown in FIG. 11. Here, the connection is done directly in the bus participant (terminal) itself.

The termination T of the bus line at the ends can be done internally or externally, as is shown in FIG. 10 and FIG. 11. An external termination is realized by a resistor, which is applied in the shielded region, e.g., in the shielded region of a connector. This resistor, which is used for the internal and external termination, typically has a rated impedance value of the bus cable and differs from it preferably by not more than 7%.

For the bus communication, cables are typically used having a rated impedance of 120Ω with a tolerance of 10% and an attenuation value of 24.3 dB/100 m at a frequency of 100 MHz, such as cables of type BMS13-80T02C02G024. The layout of the cable with the shielded and twisted two-wire conductors is shown in FIG. 12.

The invention claimed is:

1. A method for transmitting messages in a computer network, wherein the computer network comprises a first set of computing nodes (101-105), which are connected to each other by at least one star coupler (201, 202) and/or at least one multi-hop network (1000), wherein each of the first set of computing nodes (101-105) is connected by at least one communication line (110) to the at least one star coupler (201, 201) or the at least one multi-hop network (1000), wherein the first set of computing nodes (101-105) exchange Ethernet messages with each other, and wherein the exchange of at least some of the Ethernet messages of the first set of computing nodes (101-105) occurs in a time-triggered manner, the method comprising:

providing a second set of computing nodes (106-108), which are connected to each other by at least one bus (210), wherein the at least one bus (210) is connected to the at least one star coupler (201) and/or the at least one multi-hop network (1000);

exchanging Ethernet messages between the second set of computing nodes (106-108), wherein the exchange of at least some of the Ethernet messages of the second set of computing nodes (106-108) occurs in a time-triggered manner; and c) exchanging Ethernet messages between the second set of computing nodes (106-108) and the first set of computing nodes (101-105), wherein the exchange of at least some of the Ethernet messages of the first and second sets of computing nodes (101-108) occurs in a time-triggered manner, wherein at least some of the computing nodes of the first set of computing nodes (101-105) and the at least one star coupler (201, 202) or the at least one star coupler of the at least one multi-hop network (1000) construct a synchronous time base, and wherein the at least one star coupler (201, 202) and/or the at least one multi-hop network (1000) send the Ethernet messages (300, 301, 302, 303) to the computing nodes of the second set of computing nodes (106-108), which are used for synchronization of local clocks of the computing nodes of the second set of computing nodes (106-108), and wherein the computing nodes of the second set of computing nodes (106-108) save local information on transmission durations (601, 602, 603) occurring on the at least one bus (210, 220) during the transmission of the Ethernet messages (300, 301, 302, 303) to the computing nodes of the second set of computing nodes (106-108) from the at least one star coupler (201, 202) and/or the at least one multi-hop network (1000), or wherein the at least one star coupler (201, 202) and/or the at least one multi-hop network (1000) send different Ethernet messages (301, 302, 303) to the computing nodes of the second set of computing nodes (106-108) across the at least one bus (210, 220) and the Ethernet messages (301, 302, 303) include information on transmission durations (601,602,603) occurring on the at least one bus (210, 220) during the transmission from the at least one star coupler (201, 202) to the respective computing node (106-108) of the second set of computing nodes.

2. The method of claim 1, wherein the computer network has precisely one star coupler or precisely one multi-hop network to which the first and second sets of computing nodes are connected.

3. The method of claim 1, wherein each of the computing nodes of the first set of computing nodes (101-105) is connected to two or more star couplers (201, 202) and/or to two or more multi-hop networks (1000) by redundant communication lines (110, 120), and wherein the computing nodes of the first set of computing nodes (101-105) send redundant copies of the Ethernet messages in parallel by the redundant communication lines (110, 120).

4. The method of claim 3, wherein the computing nodes of the second set of computing nodes (106-108) are connected to each other by two or more redundant buses (210, 220), such that each of the computing nodes of the second set of computing nodes (106-108) is connected to at least two redundant buses (210, 220).

5. The method of claim 4, wherein each redundant bus (210, 220) of the two or more redundant buses (210, 220) is connected to a star coupler (201, 202) of the at least one star coupler (201, 202) that is specially assigned to it or a multi-hop network (1000) of the at least one multi-hop network (1000) that is specially assigned to it.

6. The method of claim 1, wherein the SAE AS6802 standard or a standard based on this or a successor standard is used to implement the communication paradigm in the time triggered manner.

7. The method of claim 6, wherein, for each bus (210, 220) of the at least one bus, at most one of the computing nodes of the second set of computing nodes (106-108) is configured as a synchronization master according to the SAE AS6802 standard and all the other computing nodes of the second set of computing nodes (106-108) are configured as synchronization clients.

8. The method of claim 6, wherein the at least one star coupler(s) (201, 202) to which the at least one bus (210, 220) is directly connected is configured as compression master according to the SAE AS 6802 standard.

9. The method of claim 6, wherein the Ethernet messages (301, 302, 303) which are used for the synchronization of the computing nodes of the second set of computing nodes are protocol control frames according to the SAE AS 6802 standard.

10. The method of claim 1, wherein the IEEE 802.1AS standard or a standard based on this or a successor standard is used to implement the communication paradigm in the time-triggered manner.

11. The method of claim 1, wherein the IEEE 1588 standard or a standard based on this or a successor standard is used to implement the communication paradigm in the time-triggered manner.

12. The method of claim 1, wherein the IEEE 802.1Q standard or a standard based on this or a successor standard is used to implement the communication paradigm in the time-triggered manner.

13. The method of claim 1, wherein the at least one star coupler (201, 202) and/or the at least one multi-hop network sends non-time-controlled messages (C3101) as time-controlled messages (C3101T) to the second set of computing nodes (106-108) which are connected by the at least one bus (210, 220).

14. The method of claim 1, wherein the at least one star coupler (201, 202) and/or the at least one multi-hop network sends time-controlled messages (D3108T), which are received by the at least one star coupler (201, 202) and/or the at least one multi-hop network from the second set of computing nodes (106-108) which are connected by the at least one bus (210, 220), as non-time-controlled messages (C3101) to the first set of computing nodes (101-105).

15. The method of claim 1, wherein the at least one bus (210, 220) includes at least one of the following technical properties:
   a) as the physical bus, technology EIA-485 with a data rate of 10 Mbps is used;
   b) the data transmission is based on the Manchester Code per IEEE 802.5;
   c) for the communication of the bus participants, a physical medium is used which is based on shielded and twisted two-wire conductors;
   d) the physical coupling of the individual participants to the bus medium is done by stub-connected terminals or daisy-chained terminals; and
   e) as the physical bus, technology MIL-STD-1553B with a data rate of 10 Mbps is used.

16. A TTEthernet computer network or other computer network, wherein the computer network comprises a first set of computing nodes (101-105), which are connected to each other by at least one star coupler (201, 202) and/or at least one multi-hop network (1000), wherein each of the first set of computing nodes (101-105) is connected by at least one communication line (110) to the at least one star coupler (201, 201) or the at least one multi-hop network (1000), wherein the first set of computing nodes (101-105) exchange Ethernet messages with each other, and wherein the exchange of at least some of the Ethernet messages of the first set of computing nodes (101-105) occurs in a time-triggered manner, the computer network comprising:
   a second set of computing nodes (106-108), which are connected to each other by at least one bus (210), wherein the at least one bus (210) is connected to the at least one star coupler (201) and/or the at least one multi-hop network (1000);
   the second set of computing nodes (106-108) are configured to exchange Ethernet messages with each other, wherein the exchange of at least some of the Ethernet messages of the second set of computing nodes (106-108) occurs in a time-triggered manner; and
   the second set of computing nodes (106-108) are configured to exchange Ethernet messages with the first set of computing nodes (101-105), wherein the exchange of at least some of the Ethernet messages of the first and second sets of computing nodes (101-108) occurs in a time-triggered manner,
   wherein at least some of the computing nodes of the first set of computing nodes (101-105) and the at least one star coupler (201, 202) or the at least one star coupler of the at least one multi-hop network (1000) construct a synchronous time base, and wherein the at least one star coupler(s) (201, 202) and/or the at least one multi-hop network(s) (1000) send the Ethernet messages (300, 301, 302, 303) to the computing nodes of the second set of computing nodes (106-108), which are used for synchronization of local clocks of the computing nodes of the second set of computing nodes (106-108), and
   wherein the computing nodes of the second set of computing nodes (106-108) save local information on transmission durations (601, 602, 603) occurring on the at least one bus (210, 220) during the transmission of the Ethernet messages (300, 301, 302, 303) to the computing nodes of the second set of computing nodes (106-108) from the at least one star coupler (201, 202) and/or the at least one multi-hop network (1000), or
   wherein the at least one star coupler (201, 202) and/or the at least one multi-hop network (1000) send different Ethernet messages (301, 302, 303) to the computing nodes of the second set of computing nodes (106-108) across the at least one bus (210, 220) and the Ethernet messages (301, 302, 303) include information on transmission durations (601,602,603) occurring on the at least one bus (210, 220) during the transmission from the at least one star coupler (201, 202) to the respective computing node (106-108) of the second set of computing nodes.

17. The computer network of claim 16, wherein the computer network has precisely one star coupler or precisely one multi-hop network to which the first and second sets of computing nodes are connected.

18. The computer network of claim 16, wherein each of the computing nodes of the first set of computing nodes (101-105) is connected to two or more star couplers (201, 202) and/or to two or more multi-hop networks (1000) by redundant communication lines (110, 120), and wherein the computing nodes of the first set of computing nodes (101-105) send redundant copies of the Ethernet messages in parallel by the redundant communication lines (110, 120).

19. The computer network of claim 18, wherein the computing nodes of the second set of computing nodes (106-108) are connected to each other by two or more redundant buses (210, 220), such that each of the computing nodes of the second set of computing nodes (106-108) is connected to at least two redundant buses (210, 220).

20. The computer network of claim 19, wherein each redundant bus (210, 220) of the two or more redundant buses (210, 220) is connected to a star coupler (201, 202) of the at least one star coupler (201, 202) specially assigned to it or a multi-hop network (1000) of the at least one multi-hop network (1000) specially assigned to it.

21. The computer network of claim 16, wherein the SAE AS6802 standard or a standard based on this or a successor standard is used to implement the communication paradigm in the time-triggered manner.

22. The computer network of claim 21, wherein, for each bus (210, 220) of the at least one bus, at most one of the computing nodes of the second set of computing nodes (106-108) is configured as a synchronization master according to the SAE AS6802 standard and all the other computing nodes of the second set of computing nodes (106-108) are configured as synchronization clients.

23. The computer network of claim 21, wherein the at least one star coupler(s) (201, 202) to which the at least one bus (210, 220) is directly connected is configured as compression master according to the SAE AS 6802 standard.

24. The computer network of claim 21, wherein the Ethernet messages (301, 302, 303) which are used for the synchronization of the computing nodes of the second set of computing nodes are protocol control frames according to the SAE AS 6802 standard.

25. The computer network of claim 16, wherein the IEEE 802.1AS standard or a standard based on this or a successor standard is used to implement the communication paradigm in the time-triggered manner.

26. The computer network of claim 16, wherein the IEEE 1588 standard or a standard based on this or a successor standard is used to implement the communication paradigm in the time-triggered manner.

27. The computer network of claim 16, wherein the IEEE 802.1Q standard or a standard based on this or a successor standard is used to implement the communication paradigm in the time-triggered manner.

28. The computer network of claim 16, wherein the at least one star coupler (201, 202) and/or the at least one multi-hop network are configured to send non-time-controlled messages (C3101) as time-controlled messages (C3101T) to the second set of computing nodes (106-108) which are connected by the at least one bus (210, 220).

29. The computer network of claim 16, wherein the at least one star coupler (201, 202) and/or the at least one multi-hop network are configured to send time-controlled messages (D3108T), which are received by the at least one star coupler (201, 202) and/or the at least one multi-hop network from the second set of computing nodes (106-108) which are connected by the at least one bus (210, 220), as non-time-controlled messages (C3101) to the first set of computing nodes (101-105).

30. The computer network of claim 16, wherein the at least one bus (210, 220) includes at least one of the following technical properties:
   a) as the physical bus, technology EIA-485 with a data rate of 10 Mbps is used;
   b) the data transmission is based on the Manchester Code per IEEE 802.5;
   c) for the communication of the bus participants, a physical medium is used which is based on shielded and twisted two-wire conductors;
   d) the physical coupling of the individual participants to the bus medium is done by stub-connected terminals or daisy-chained terminals; and
   e) as the physical bus, technology MIL-STD-1553B with a data rate of 10 Mbps is used.

* * * * *